(12) United States Patent
Winkler et al.

(10) Patent No.: US 8,639,954 B2
(45) Date of Patent: Jan. 28, 2014

(54) PORTABLE ELECTRONIC DEVICE AND METHOD FOR RECOVERING POWER TO A RECHARGEABLE BATTERY USED THEREIN

(75) Inventors: David A. Winkler, Spring Grove, IL (US); Robert M. Johnson, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 435 days.

(21) Appl. No.: 12/973,450

(22) Filed: Dec. 20, 2010

(65) Prior Publication Data

US 2012/0159220 A1 Jun. 21, 2012

(51) Int. Cl.
G06F 1/26 (2006.01)

(52) U.S. Cl.
USPC .......................................................... 713/300

(58) Field of Classification Search
USPC .......................................................... 713/300
See application file for complete search history.

(56) References Cited

U.S. PATENT DOCUMENTS

| | | |
|---|---|---|
| 5,150,031 A | 9/1992 | James et al. |
| 5,534,765 A | 7/1996 | Kreisinger et al. |
| 5,717,307 A | 2/1998 | Barkat et al. |
| 5,764,030 A * | 6/1998 | Gaza ............................ 320/116 |
| 5,847,543 A | 12/1998 | Carroll |
| 6,075,342 A | 6/2000 | Koenck |
| 6,114,831 A * | 9/2000 | Attimont et al. .............. 320/106 |
| 7,493,109 B2 | 2/2009 | Munje et al. |
| 7,570,019 B2 | 8/2009 | MacNair, Jr. et al. |
| 8,253,388 B2 * | 8/2012 | Cordes et al. ................. 320/160 |
| 8,319,475 B2 * | 11/2012 | Choksi et al. ................. 320/110 |
| 2008/0054841 A1 | 3/2008 | Kerkman et al. |

OTHER PUBLICATIONS

Patent Cooperation Treaty, International Search Report and Written Opinion of the International Searching Authority for International Application No. PCT/US2011/063865, May 3, 2012, 13 pages.

* cited by examiner

Primary Examiner — Kim Huynh
Assistant Examiner — Eric Chang (57) ABSTRACT

A portable electronic device employs a method for recovering power to a rechargeable battery used therein when the battery is in a low state of charge. The portable electronic device includes at least a power management subsystem (PMS), a main processor subsystem, and the battery. When the battery is incapable of supplying boot-up power to the processor subsystem, power is provided from a battery charger to the PMS to power-up the PMS. The PMS then determines the battery's type and a state-of-charge (SOC) parameter for the battery, and compares the SOC parameter to a threshold, which is based on at least the battery type. If the SOC parameter is less than the threshold, power is provided from the battery charger to the battery for use in recharging the battery. Otherwise, power is supplied from the battery to the processor subsystem to facilitate general operation of the portable electronic device.

22 Claims, 4 Drawing Sheets

PORTABLE ELECTRONIC DEVICE AND METHOD FOR RECOVERING POWER TO A RECHARGEABLE BATTERY USED THEREIN

FIELD OF THE INVENTION

The present invention relates generally to portable electronic devices and, more particularly, to a portable electronic device and method for recovering power to a rechargeable battery used therein regardless of battery type.

BACKGROUND

Portable electronic devices that use rechargeable batteries are well known. Such devices include, but are not limited to, smart phones, cellular phones, MP3 players, portable gaming systems, portable computers (e.g., laptop computers, notebook computers, netbook computers, palmtop computers, and tablet computers), wireless reading devices (e.g., the AMAZON KINDLE), and battery-powered tools. The continued use of such devices requires that their batteries be periodically recharged. The procedures for recharging the particular batteries depend upon the chemistries of the batteries. For example, batteries with a nickel-cadmium (NiCad) chemistry require a different recharging process than do batteries with a lithium-ion chemistry.

Portable electronic devices typically use a single processor to handle primary functional features of the device, as well as battery charging. Thus, the single processor often requires a substantial amount of power just to boot up (e.g., on the order of 20 milliamp-hours (mAh) at 3.25 volts for a typical smart phone). Such start-up power requirements dictate the minimum level of charge required in the battery for the device processor to boot reliably.

After a battery has been discharged to the point where it can no longer supply sufficient power for the device processor to boot up, the battery must be recharged for a sufficient length of time to achieve a minimum voltage level that insures that the battery can meet the boot up power requirements of the device processor. Such a minimum voltage level is typically referred to as the "cutover voltage" and the recharging process is typically referred to as "recovery." Once the battery has recovered and the cutover voltage has been attained, the battery can supply the processor sufficient power to boot up and begin device operation. The cutover voltage is typically pre-programmed into device memory based on the chemistry or type of the battery originally intended for use in the device.

Figure 1:
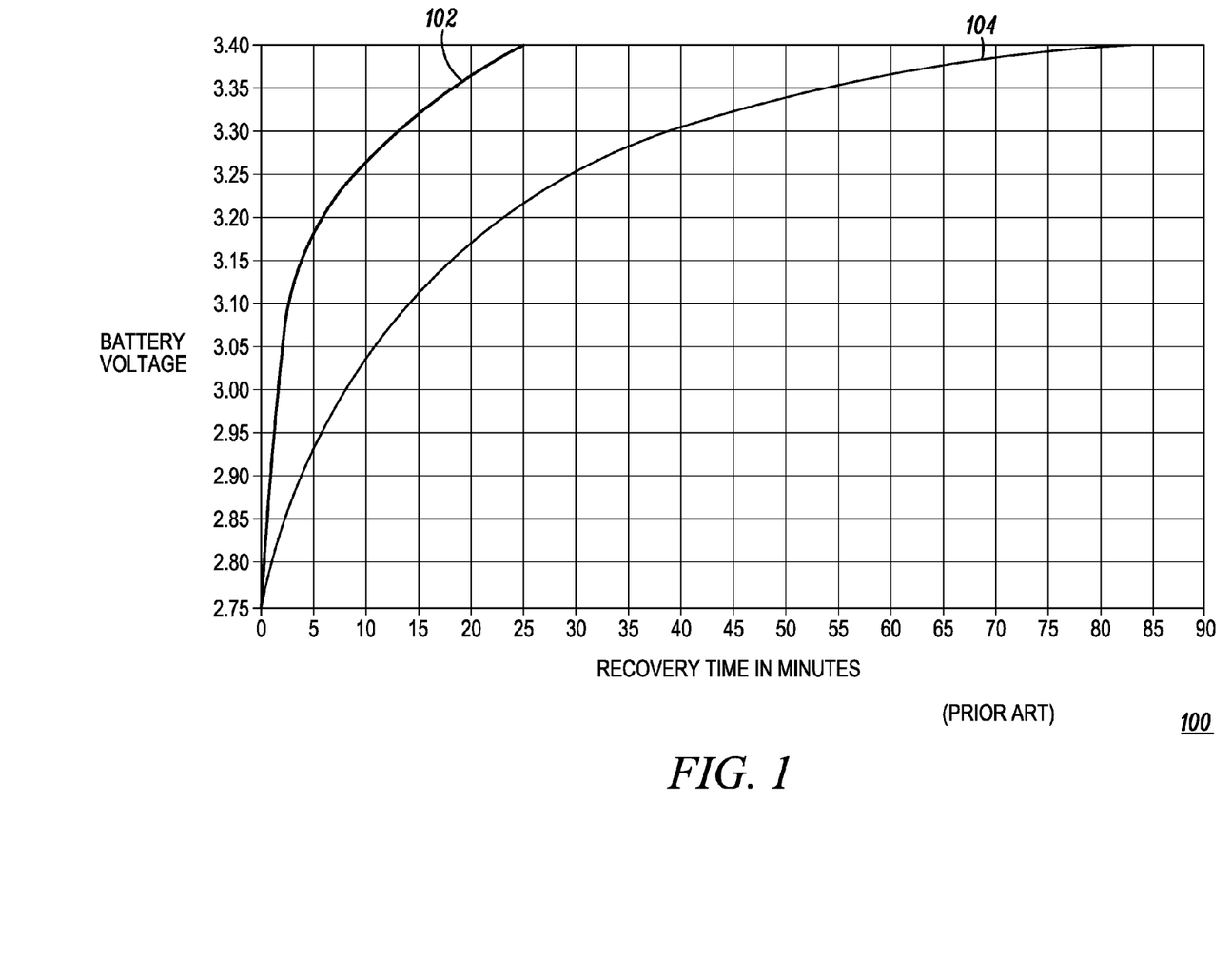
FIG. 1 is a graph of recovery time versus battery voltage for exemplary LV and LCO batteries recharged in a prior art portable electronic device designed to be used with the LCO battery.

However, as battery technologies evolve, battery chemistries change. Therefore, depending upon how long a portable electronic device remains in use and how fast battery technology changes, a battery with a newer technology, and possibly the ability to supply processor boot up power at a voltage lower than the pre-programmed cutover voltage, may be used with a device. For example, lithium-ion batteries are currently transitioning from chemistries, such as lithium cobalt oxide (LCO), with end of life voltages of at least three volts to lower voltage (LV), higher energy density chemistries with end of life voltages of less than three volts. As a result, when an LV battery is used in a portable electronic device originally designed for use with an LCO battery, the charging time required to attain a pre-programmed cutover voltage above three volts would increase dramatically because the LV battery fully recovers at less than three volts. An example of the dramatic increase in charging time is illustrated in FIG. 1, which depicts a graph 100 of recovery time versus battery voltage for exemplary LV and LCO batteries recharged in a portable electronic device designed for use with the LCO battery, when the state of charge for each battery is 2.75 volts and the processor of the portable device boots up at 3.25 volts. As shown, the LCO battery recovery curve 102 illustrates that the LCO battery recovers to 3.25 volts in about nine minutes; whereas, the LV battery recovery curve 104 illustrates that the LV battery recovers to 3.25 volts in about thirty minutes, which is more than three times longer than the LCO battery recovery. Therefore, because portable electronic devices are not presently designed to adapt battery recovery processes to accommodate different battery chemistries or types, battery recovery can be undesirably long when new, more efficient battery types are used in devices originally designed for older, less efficient battery types.

Skilled artisans will appreciate that elements in the figures are illustrated for simplicity and clarity and have not necessarily been drawn to scale. For example, the dimensions of some of the elements in the figures may be exaggerated alone or relative to other elements to help improve the understanding of the various embodiments of the present invention.

DETAILED DESCRIPTION

Generally, the present invention encompasses a portable electronic device and associated method for recovering power to a rechargeable battery used therein regardless of battery type. The portable electronic device may be any transportable electronic device that uses a rechargeable battery as its power source. For example, the portable electronic device may be a wireless communication device (e.g., a smart phone, a cellular phone, a wireless email device, or a portable computer (e.g., a laptop computer, a notebook computer, a netbook computer, a palmtop computer, a tablet computer, or any other type of transportable computing device)), an MP3 player, a portable gaming system, a wireless reading device (e.g., the AMAZON KINDLE), a flashlight, a portable audio recording device, a camera, a battery-powered tool, or any other transportable electronic device. In one exemplary embodiment, the portable electronic device may include a rechargeable battery, a power source receptor, a processor subsystem, and a power management subsystem. In such an embodiment, the power source receptor is operable to receive power from an external battery charger. The processor subsystem is operably coupled to the battery and operable to control general operation of the portable electronic device upon receiving a threshold level of power from the battery.

The power management subsystem, which is operably coupled to the power source receptor and the battery, is operable to perform a variety of power management functions in the context of the present invention. In particular, the power management system is operable to power-up upon receipt of power from the battery charger via the power source receptor. The power management system is also operable to determine a battery type and at least one state-of-charge (SOC) parameter (e.g., then-current voltage or energy capacity) for the battery. The power management system is further operable to compare the SOC parameter(s) to one or more respective thresholds that are based at least on the battery type and correspond to the threshold level of power required by the processor subsystem. The power management system is operable further yet to enable power to be supplied from the battery charger to the battery for use in recharging the battery in the event that the SOC parameter(s) for the battery is less than the threshold(s). Finally, the power management system is operable to enable power to be supplied from the battery to the processor subsystem in the event that the SOC parameter(s) for the battery is greater than or equal to the threshold(s).

In other embodiments, the power management system may be operable to perform various other functions in the context of the present invention and in the context of general operation of the particular portable electronic device. For example, when the battery used with the portable electronic device includes a battery memory that stores an identification (ID) for the battery, the power management subsystem may be further operable to retrieve the battery ID from the battery memory and compare it to a list of battery IDs stored in a memory of the portable electronic device, wherein the list correlates battery ID with battery type. Upon determining the battery type from the list, the power management subsystem may determine the threshold against which the SOC parameter is compared. The threshold may also be stored in the memory of the portable electronic device in relation to the battery type. Alternatively or additionally, the battery memory may store SOC information for the battery, such as end of life voltage data, charging rate, discharge rate, maximum energy capacity, or pack impedance. In such a case, the power management subsystem may be further operable to retrieve the SOC information from the battery memory and determine the battery type based on the retrieved SOC information (e.g., by comparing the retrieved SOC information to a database or table relating SOC information to battery type).

In a further embodiment, the portable electronic device may include a memory operable to store power requirements information for the processor subsystem (e.g., in units of voltage, current, power, and/or energy (e.g., amp-hours or watt-hours)). In this case, the power management subsystem may be further operable to determine the threshold against which the battery SOC parameter is compared based on at least the battery type and the processor subsystem's power requirements information. For example, if the battery type is determined to be a high voltage lithium-ion battery type having an end of life voltage of at least three volts (e.g., a battery having a lithium cobalt oxide (LCO) battery chemistry) and the processor subsystem's boot-up power requirements are 20 milliamp-hours (mAh) or 55 milliwatt-hours (mWh) at 3.0 volts (V), the threshold against which the battery SOC parameter is compared may be the cutover voltage of the LCO battery, (i.e., the minimum voltage at or above the battery's end of life voltage for which the battery can meet the processor subsystem's power requirements). For an LCO battery, the cutover voltage may be about 3.25 V, which would be greater than the voltage needed by the processor subsystem. On the other hand, if the battery type is determined to be a low voltage (LV) lithium-ion battery type having an end of life voltage of less than three volts, the threshold against which the battery SOC parameter is compared may be the cutover voltage for the LV battery (where the cutover voltage is greater than the minimum voltage required by the processor subsystem) or the minimum voltage required by the processor subsystem (where the cutover voltage of the battery is less than the minimum voltage required by the processor subsystem).

In a further embodiment, the power management subsystem may also be operable to adapt a charging profile for voltage and current supplied from the battery charger to the battery based on at least the battery type. For example, the charging profile for an LV battery is typically different than the charging profile for an LCO battery. Consequently, the power management subsystem may adjust or adapt the charging profile, or otherwise provide power from the battery charger to the battery, taking into account the battery type in order to safely and reliably recover the battery from its undesirably low state of charge. Additionally, the power management subsystem may be operable to determine a type for the battery charger and adapt the charging profile, or otherwise provide power from the battery charger to the battery, based on at least the battery type and the battery charger type. For example, the power management subsystem may be able to detect whether the battery charger is a Universal Serial Bus (USB) charger, a wall-outlet charger, a wireless charger (e.g., an inductive charger), or any other type of charger and adapt the charging profile or otherwise provide power from the battery charger to the battery to take into account the type of charger as well as the type of battery. Further, the power management subsystem may be further operable to determine a temperature of the battery and adapt the charging profile or otherwise provide power from the battery charger to the battery based on the battery type, the battery charger type, and the battery temperature. For example, the power management system may permit the battery charger to supply power to the battery for only so long as the battery temperature is within a predetermined range or below a maximum temperature.

In yet another embodiment, a method is provided for recovering power to a rechargeable battery in a portable electronic device when the battery is in a low state of charge and is of a determinable battery type. According to this embodiment, power is provided from an external battery charger to a power management subsystem to power-up the power management subsystem. After being powered-up, the power management subsystem determines a battery type and an SOC parameter for the battery. The power management subsystem then compares the SOC parameter for the battery to a threshold that is based on at least the battery type. In the event that the SOC parameter for the battery is less than the threshold, power is provided (e.g., under the control of the power management subsystem) from the battery charger to the battery for use in recharging the battery. Alternatively, in the event that the SOC parameter for the battery is greater than or equal to the threshold, power is supplied (e.g., again under the control of the power management subsystem) from the battery to a processor subsystem that controls general operation of the portable electronic device. In one embodiment, the processor subsystem has greater power requirements than the power management subsystem; thus, the power management function is separate from the general electronic device operation controlled by the main processor subsystem. In another embodiment, the power management subsystem repeatedly re-determines the SOC parameter for the battery as the battery is recharging or after the battery has been recharging for a predetermined period of time in order to, for example, determine when the SOC parameter for the battery has reached the threshold.

In a further embodiment, a method is provided for recovering power to a rechargeable battery in a portable electronic device when the battery is in a low state of charge and is of a determinable battery type. According to this embodiment, power is received from a battery charger coupled to the portable electronic device. The received power is provided from the battery charger to a power management subsystem to power-up the power management subsystem. After being powered-up, the power management subsystem determines a battery type and an SOC parameter for the battery. The power management subsystem then compares the SOC parameter for the battery to a threshold that is based on at least the battery type and an amount of power required by a processor subsystem. The processor subsystem controls general operation of the portable electronic device and has higher power requirements than the power management subsystem. In the event that the SOC parameter for the battery is less than the threshold, power is provided (e.g., under the control of the power management subsystem) from the battery charger to the battery for use in recharging the battery. Alternatively, in the event that the SOC parameter for the battery is greater than or equal to the threshold, power is supplied (e.g., again under the control of the power management subsystem) from the battery to the processor subsystem.

By recovering power to a rechargeable battery in this manner, the present invention adapts battery power recovery to at least the battery type and optionally to the charger type and/or the battery temperature. In this manner, the present invention enables portable electronic devices to use various types of batteries, without requiring changes in the main processor system to facilitate recharging of a battery of a different type than the battery originally supplied with the portable electronic device. Additionally, the present invention utilizes a power management subsystem that is separate from the main processor subsystem to facilitate battery recovery, thereby enabling battery recovery to occur more quickly because the main processor subsystem remains unpowered until the battery has recovered.

Figure 2:
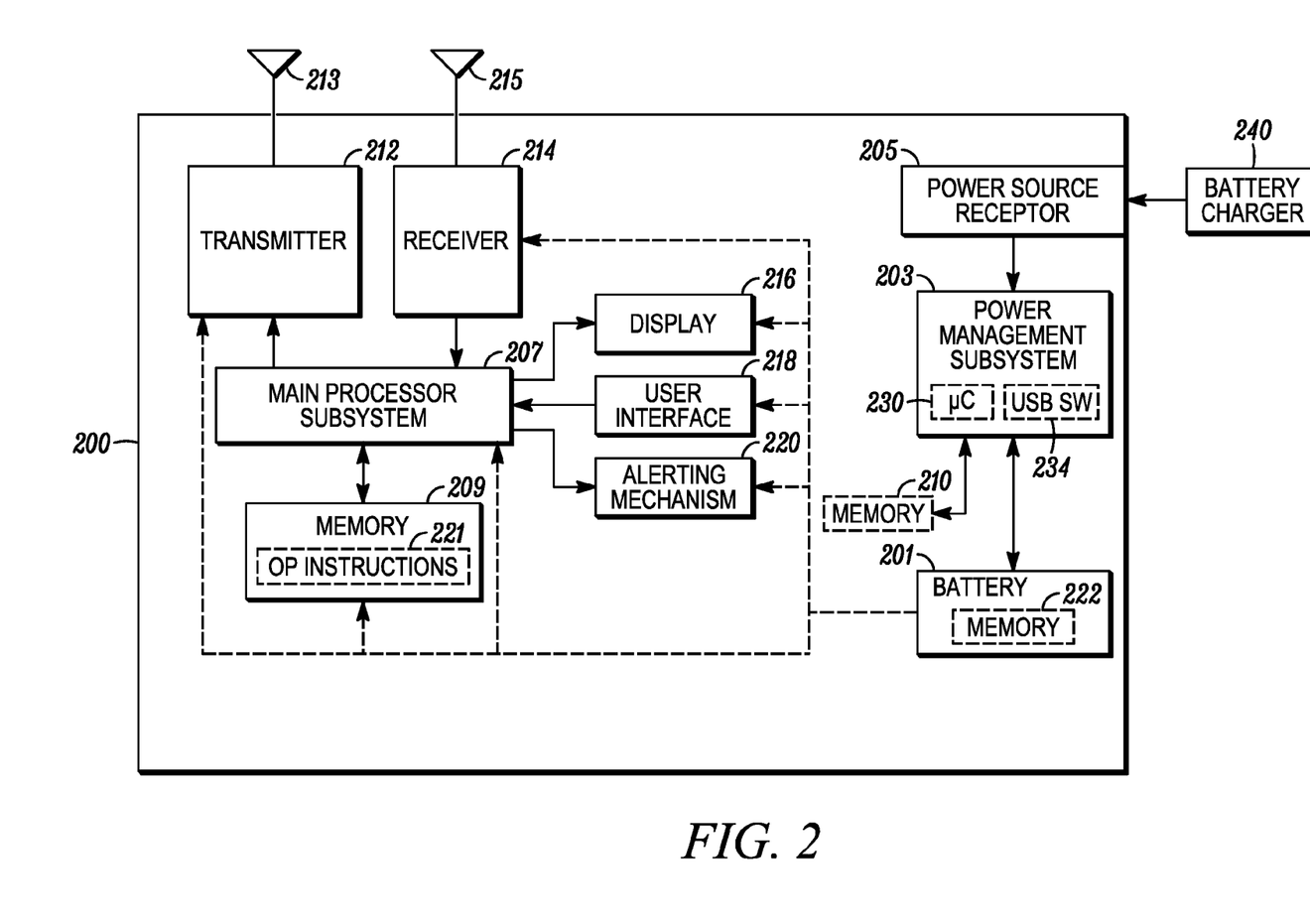
FIG. 2 is an electrical block diagram of a portable electronic device adapted to recover power to a rechargeable battery based on battery type when the battery is in a low state of charge, in accordance with an exemplary wireless communication device embodiment of the present invention.
Figure 3:
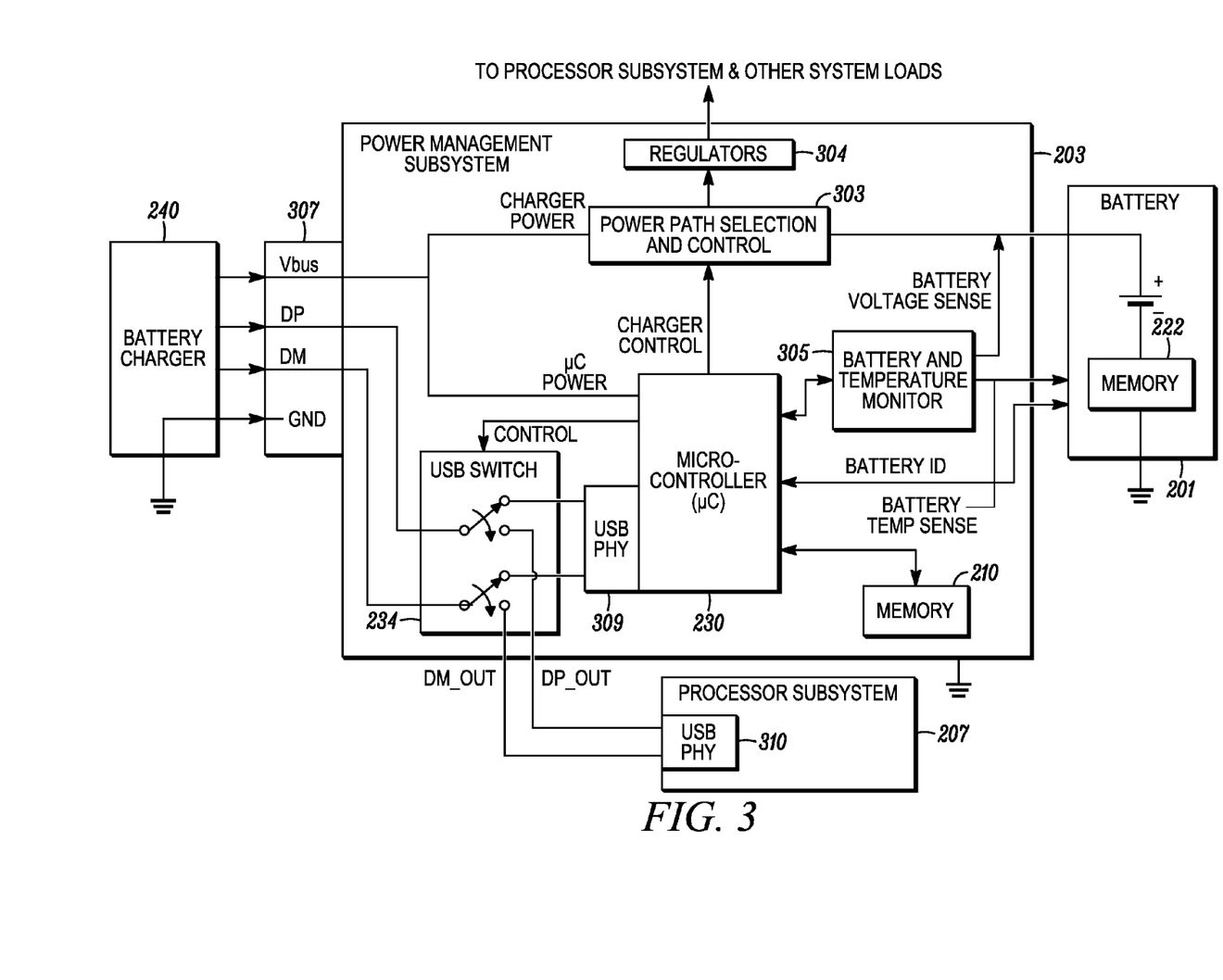
FIG. 3 is an electrical block diagram showing the interrelation between a power management subsystem, a battery charger, a rechargeable battery, and a processor subsystem of the exemplary portable electronic device of FIG. 2 when the battery charger is a USB charger.
Figure 4:
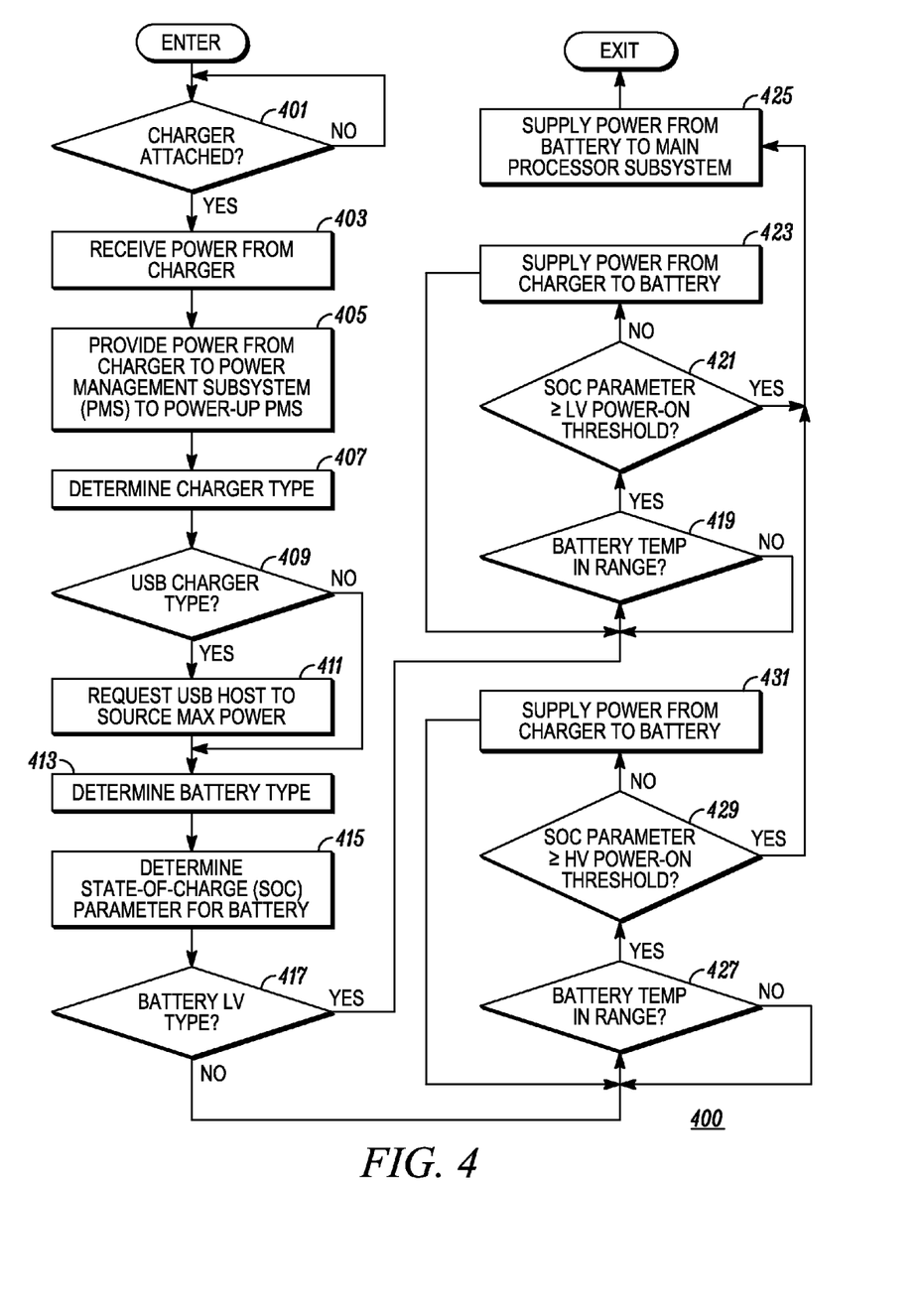
FIG. 4 is a logic flow diagram of steps executed by a portable electronic device to recover power to a rechargeable battery based on battery type when the battery is in a low state of charge, in accordance with an exemplary embodiment of the present invention.

Embodiments of the present invention can be more readily understood with reference to FIGS. 2-4, in which like reference numerals designate like items. FIG. 2 is an electrical block diagram of a portable electronic device 200 adapted to recover power to a rechargeable battery 201 based on battery type when the battery 201 is in a low state of charge, in accordance with an exemplary wireless communication device embodiment of the present invention. The exemplary portable electronic device 200 (which, in this embodiment, is a wireless communication device) includes, inter alia, a power management subsystem 203, a power source receptor 205, a main processor subsystem 207, at least one storage device (e.g., memory 209, 210), a transmitter 212, a receiver 214, a display 216, a user interface 218, an alerting mechanism 220, and one or more antennas 213, 215 (two shown). The power source receptor 205 is coupled to an external battery charger 240 during times when the battery 201 is recharging. The battery charger 240 may be a conventional in-wall charger (e.g., AC-to-DC charger), a wireless charger, a USB charger, a car charger (e.g., a DC-to-DC charger), or any other battery charger (including, for example, a computer or other electronic device that serves as a USB host device for a USB charger). Analogously, the power source receptor 205 may be a connector (e.g., for an in-wall or car charger), a wireless charge signal receptor, or any other appropriately-configured receptor for receiving power from the battery charger 240.

As illustrated, the power management subsystem 203 is coupled between the power source receptor 205 and the battery 201. The power management subsystem 203 controls the flow of power from the battery charger 240 to the battery 201 and from the battery 201 to the remainder of the portable electronic device 200, including the main processor subsystem 207. In one embodiment, the power management subsystem 203 includes a microcontroller (μC) 230 and a switch, which may be a USB switch 234 that facilitates charging from a USB charger. The power management subsystem 203 may include or have access to local memory 210 that stores information, such as a table of battery identifications (IDs) and associated battery types, a table of state-of-charge (SOC) data and associated battery types, charging profiles, and other information, which may be used by the power management subsystem 203 for purposes of recovering power to the battery 201 in accordance with various embodiments of the present invention. The power management subsystem 203 may also include a set of regulators (not shown) that output various regulated DC voltages from the battery 201 or the power source receptor 205, as selected by the microcontroller 230, to the processor subsystem 207 and other portable device components (system loads) as may be respectively required by the processor subsystem 207 and the system loads. An exemplary embodiment of the power management subsystem 203 for use with a USB battery charger is described in more detail below with respect to FIG. 3.

The battery 201 supplies DC power to the main functional elements of the portable electronic device 200 when the power management system 203 switchably couples the battery 201 to such elements. Thus, when the portable electronic device 200 is a wireless communication device as illustrated in FIG. 2, the battery 201 is coupled directly or indirectly (e.g., via regulator circuits) to the main processor subsystem 207, the device memory 209, the transmitter 212, the receiver 214, the display 216, the user interface 218, and the alerting mechanism 220. The battery 201 may also be coupled to one or more of the antennas 213, 215 when the antennas 213, 215 include active components. In one embodiment, the battery 201 includes a battery memory 222 that stores information which may be used to recover power to the battery 201 in accordance with the present invention. For example, the battery memory 222 may include an identification of the battery 201 (e.g., which indicates the battery chemistry) or SOC information, such as the battery's end of life voltage, energy capacity, discharge rate, charging rate, maximum operating temperature, or pack impedance, which the power management subsystem 203 may utilize to determine battery-related parameters associated with a battery recovery process as described in more detail below. The battery 201 may be any rechargeable battery type, including high voltage lithium-ion (e.g., LCO), low voltage lithium-ion, lithium-ion polymer, lithium-phosphate, lithium-metal, lithium-sulfur, nickel-cadmium, nickel-metal hydride, nickel zinc, potassium-ion, rechargeable alkaline, or any future-developed battery technology. As a result, the battery 201 may be of a high voltage (HV) type or a low voltage (LV) type. As used herein at least with respect to lithium-ion batteries, high voltage refers to a battery having an end of life voltage of at least three volts and low voltage refers to a battery having an end of life voltage of less then three volts. Thus, battery type can be defined by end of life voltage, battery chemistry, and/or other battery parameters. One of the primary benefits of the present invention is that the disclosed battery recovery process accommodates batteries of various types.

The main processor subsystem 207 controls general operation of the portable electronic device 200 and, in the wireless communication device embodiment of FIG. 2, is operably coupled to the memory 209, the transmitter 212, the receiver 214, the display 216, the user interface 218, and the alerting mechanism 220. In the wireless communication device embodiment, the portable electronic device 200 may optionally include various other elements, including, but not limited to, input/output ports (which may be wired or wireless interfaces, such as USB, MP3, Wi-Fi, and/or Bluetooth interfaces) and an external memory interconnect to interface with a separate, transportable external memory device (e.g., a USB flash drive, a flash memory card, a subscriber identification module (SIM) card, or any other portable storage device). When included, the optional components are operably coupled to and controlled directly or indirectly by the main processor subsystem 207.

When the portable communication device 200 is a wireless communication device, the portable electronic device 200 may be any device or user equipment (UE) capable of communicating voice, data, and/or video over a wireless communication system. Accordingly, the portable electronic device 201 may be a smart phone, a cellular phone, a mobile phone, a two-way radio, a wireless messaging device, a computer with an embedded or attached wireless modem or air card (e.g., a netbook computer, a tablet computer, a notebook computer, a laptop computer, or a palmtop computer), a personal digital assistant (PDA), a wireless email device, a hand-held or portable gaming device including an embedded or attached wireless modem, a portable DVD player including an embedded or attached wireless modem, or any other mobile or portable communication device. As noted above, the wireless communication device illustrated in FIG. 2 is merely one example of a portable electronic device 200 that may beneficially employ and/or implement the present invention. Other portable electronic devices that may employ and/or implement the present invention include, but are not limited to, MP3 players, portable gaming systems, wireless reading devices, flashlights, portable audio recording devices, cameras, battery-powered tools, or any other transportable electronic devices.

The processor subsystem 207 may include a microprocessor, a microcontroller, a digital signal processor (DSP), a state machine, logic circuitry, or any other device or combination of devices that processes information based on operating or programming instructions 221 stored in the device memory 209. One of ordinary skill in the art will appreciate that the processor subsystem 207 can be implemented using multiple processors as may be required to handle the processing requirements of the portable electronic device 200. One of ordinary skill in the art will further recognize that when the processor subsystem 207 has one or more of its functions performed by a state machine or logic circuitry, the memory containing the corresponding operational instructions can be embedded within the state machine or logic circuitry as opposed to being external to the processor subsystem 207, as is the wireless device's internal memory 209 illustrated in FIG. 2.

In the wireless device embodiment of FIG. 2, device memory 209 stores, inter alia, the operating instructions 221 used by the processor subsystem 207 to control operation of the various components of the portable electronic device 200. Similarly, device memory 210 accessible by the power management subsystem 203 may include operating instructions used by the power management subsystem 203 to recover power to the battery 201 as described in more detail below with respect to FIGS. 3 and 4. Memory 209 may be separate from the processor subsystem 207 as depicted in FIG. 2 or be integrated into the processor subsystem 207 as noted above. Analogously, memory 210 may be separate from the power management subsystem 203 as depicted in FIG. 2 or be integrated into the power management subsystem 203 (e.g., as illustrated in FIG. 3). When memory 210 is not integrated into the power management subsystem 203, memory 210 may be separate from memory 209 or form part of memory 209. Memory 209, 210 can include random access memory (RAM), read-only memory (ROM), flash memory, electrically erasable programmable read-only memory (EEPROM), and/or various other forms of memory as are well known in the art. It will be appreciated by one of ordinary skill in the art that the various memory components 209, 210 can each be a group of separately located memory areas in the overall or aggregate device memory and that each memory component 209, 210 may include one or more individual memory elements.

The transmitter 212 and the receiver 214 may comprise any conventional hardware and software for communicating control and user data, including voice communications, text, still images, graphics, and video, between the portable electronic device 200 and base stations providing communication service to the portable electronic device 200. Depending on the wireless protocol(s) chosen for the wireless system(s) in which the portable electronic device 200 can operate, the transmitter 212 and the receiver 214 may support one or more wireless communication protocols, such as Wi-Fi (e.g., IEEE 802.11 a/b/g/n), WiMax (e.g., IEEE 802.16), Ultra Wide-Band (e.g., IEEE 802.15.4a draft standard), CDMA, wide-band CDMA (WCDMA), time division multiple access (TDMA), Global System for Mobile Communications (GSM), Enhanced Data GSM Environment (EDGE), General Packet Radio Service (GPRS), Universal Mobile Telecommunications Service (UMTS), frequency division multiple access (FDMA), orthogonal frequency division multiplexing (OFDM), High Speed Packet Access (HSPA), Long Term Evolution (LTE), spread spectrum, or any other known or future developed physical, access or link protocol or methodology. The transmitter 212 and the receiver 214 may include multiple receivers and transmitters when multiple link technologies are employed by the portable electronic device 200. Additionally, where the receiver 214 supports single input, multiple output (SIMO) and/or multiple input, multiple output (MIMO) functionality as supported by HSPA and LTE protocols, the portable electronic device 200 may include two or more receive antennas 213 (one shown for illustration). Alternatively or additionally, multiple receive antennas may be included where the receiver 305 is a multi-mode receiver supporting reception of signals transmitted using different air interfaces (e.g., WCDMA and GSM, or CDMA and WCDMA). Further, whereas the depicted portable electronic device 200 includes only a single transmit antenna 215, one or more additional transmit antennas may be used where the transmitter 212 supports MIMO functionality and/or the transmitter 212 is a multi-mode transmitter supporting transmission of signals using different air interfaces. Still further, a single antenna may be used to support both the transmitter 212 and the receiver 214 where the single antenna is a broadband antenna and appropriate circuitry (e.g., an isolator and/or a circulator) is included within the portable electronic device 200 to isolate the transmitter and receiver functions.

The display 216 may be any conventional or future-developed display, such as a liquid crystal display (LCD), a plasma display, a light emitting diode (LED) display, an organic LED (OLED) display, or any other display technology. The display 216 includes appropriate conventional drivers and may optionally include graphics processors for illuminating various portions (e.g., pixels) of a display screen as instructed by the processor subsystem 207. The user interface 218 may be any conventional user interface or combination of conventional user interface components, such as rocker keys, buttons, a keypad, a keyboard, a scroll wheel, a thumbwheel, one or more microphones and associated speech conversion/processing software, one or more speakers, a touchpad, a touchscreen incorporated into a display screen of the display 216, or any other now known or future-developed user interface technology.

The alerting mechanism 220 may include a vibration device, a speaker with appropriate drive circuitry, and/or LEDs or other visual notification means with appropriate drive circuitry, or utilize some or all of the user interface 218 under the control of the processor subsystem 207 to alert the device user of the arrival of an incoming message or call. Such an alerting mechanism 220 is generally known in the art.

FIG. 3 is an electrical block diagram showing the interrelation between the power management subsystem 203, the battery charger 240, the rechargeable battery 201, and the processor subsystem 207 of the portable electronic device 200 of FIG. 2 when the power source receptor 205 is implemented as a USB connector 307 and the battery charger 240 is a USB charger. Additionally, FIG. 3 details functional blocks of the power management system 203 in accordance with one exemplary embodiment of the present invention.

According to the embodiment of FIG. 3, the power management subsystem 203 may include a microcontroller 230, a power path selection and control block 303, a battery and temperature monitor block 305, various DC regulators 304, and a USB switch 234. In this embodiment, the USB switch 234 is coupled to a USB physical (PHY) interface 309 of the microcontroller 230 and a USB physical interface 310 of the processor subsystem 207. The power path selection and control block 303 may be a switching circuit (e.g., a field effect transistor (FET) switch) controlled by the microcontroller 230 via a control line (indicated as CHARGER CONTROL in FIG. 3). Until the power path selection and control block 303 is closed by control signaling from the microcontroller 230, the power path selection and control block 303 remains open such that power from the battery charger 240, as supplied via the Vbus pin(s) of the USB connector 307, does not flow to the battery 201. The microcontroller 230 is also operable to control the USB switch 234 via a control line (indicated as CONTROL in FIG. 3) to selectively couple the Data Plus (DP or D+) and Data Minus (DM or D−) pins of the USB connector 307 to either the USB physical interface 309 of the microcontroller 230 or the USB physical interface 310 of the processor subsystem 207. Thus, the microcontroller 230 is operable to instruct the USB switch 234 to route data from the USB connector 307 to either the microcontroller 230 or the processor subsystem 207. Depending on the qualities of the clocks used in the power management subsystem 203 and the processor subsystem 207, each of the USB physical interfaces 309, 310 may be either high or full speed (where a high quality clock is used in the applicable subsystem) or low speed (where a lower quality clock is used in the applicable subsystem).

As described in more detail below with respect to FIG. 4, the decisions as to when to allow power to flow from the battery charger 240 to the battery 201 and when to permit USB data to be supplied from the USB connector 307 to the processor subsystem 207 are made based on sensing or otherwise determining the battery type and at least one SOC parameter for the battery 201, as well as optionally determining a threshold level of power required by the processor subsystem 207, a battery temperature, and/or a battery charger type. The sensed SOC parameter may be the battery voltage as measured or sensed by a battery and temperature monitor block 305 or other equivalent circuitry coupled to the microcontroller 230 (e.g., via a BATTERY VOLTAGE SENSE line as illustrated in FIG. 3). Alternatively, the determined SOC parameter or parameters may be the estimated amount of energy capacity remaining in the battery 201 as determined by monitoring the battery's charging and discharging currents and computing the charging and discharged energy by integrating the currents over time. The remaining energy capacity may be expressed as a coulomb count or in amp-hours, watt-hours, or other applicable units. The battery and temperature monitor block 305 may also be controlled to sense the battery's temperature (e.g., via a BATTERY TEMP SENSE line as illustrated in FIG. 3), which may be used by the microcontroller 230 to assist with determining whether the battery 201 is in proper condition to begin or continue receiving recovery power from the battery charger 240. To accommodate temperature sensing, the battery and temperature monitor block 305 may include a thermistor or other temperature sensor located in close proximity to the battery 201 in accordance with known techniques.

The microcontroller 230 may determine the battery type by retrieving an identification of the battery 201 from the battery memory 222 (e.g., via a BATTERY ID control line as illustrated in FIG. 3) and comparing the retrieved identification to a list of battery identifications stored in the microcontroller 230 or a memory 210 accessible by the microcontroller 230. When used, the list correlates battery identifications to battery types (e.g., LV type or HV type) and may optionally further correlate each battery type to one or more SOC parameter thresholds for use by the microcontroller 230 to determine the health or state of charge of the battery 201. For example, the memory 210 may indicate that the end of life threshold for an LV battery is less than three volts and that the end of life threshold for an HV type battery is three volts or more. Alternatively or additionally, the battery memory 222 may store SOC information for the battery 201, such as end of life voltage data, discharge rate, maximum energy capacity, maximum temperature, or pack impedance. In such a case, the microcontroller 230 may retrieve the SOC information for the battery 201 from the battery memory 222 (e.g., via the BATTERY ID control line) and determine the battery type based on the retrieved SOC information. For example, if the battery memory 222 stores end of life data, the microcontroller 230 may determine the battery type directly from the retrieved end of life data.

When the battery 201 has entered a low state of charge (e.g., at or below its end of life voltage or at or below a voltage level required to source sufficient power to the processor subsystem 207), a user may connect the USB battery charger 240 to the USB connector 307 for purposes of charging the battery 201. The charger 240 may also be connected, at an opposing end, to a wall socket or other source of power, such as a computer or other electronic device capable of supplying output power to the USB connector 307. After the USB battery charger 240 is connected to the USB connector 307, power is supplied from the battery charger 240 to the microcontroller 230 via a power path (e.g., indicated as μC POWER in FIG. 3) to power up the microcontroller 230. At power up of the microcontroller 230, the power path selection and control block 303 is preferably in a state that does not permit power to flow from the battery charger 240 to the battery 201.

Additionally, the USB switch 234 is preferably in a state in which the data outputs of the USB connector 307 are coupled to the microcontroller 230. Once powered, the microcontroller 230 determines a battery type for the battery 201 (e.g., by retrieving information (e.g., an ID or SOC information) stored in the battery memory 222 and comparing it to data stored in memory 210). Additionally, the microcontroller 230 may optionally direct the power path and selection and control block 303 to permit power to flow from the battery charger 240 to the processor subsystem 207 and the other components or system loads of the portable electronic device 200 while the battery 201 is recovering or recharging. The microcontroller 230 may further employ the battery and temperature monitor block 305 to sense the battery voltage or another SOC parameter for the battery 201 and optionally sense or measure the battery temperature to enable the microcontroller 230 to determine a current state of charge or health for the battery 201. In addition to determining battery type and an SOC parameter (e.g., voltage), the microcontroller 230 further determines an SOC parameter threshold (e.g., a battery voltage threshold) to which to compare to the SOC parameter in order to assess whether the battery 201 is in condition to supply power to the processor subsystem 207. The SOC parameter threshold is based on the battery type and corresponds to a threshold level of power required by the processor subsystem 207.

For example, if the processor subsystem 207 requires a supply voltage of 3.25 V and at least 20 mAh to boot up its operating system and essential applications (which are typical values for a smart phone) and the battery 201 is an LV lithium-ion battery with a cutover voltage of 2.95 V (i.e., the voltage at which the battery 201 can supply at least 20 mAh of power or energy), the battery voltage threshold may be determined to be 3.25 V because the minimum supply voltage exceeds the battery cutover voltage and needs to be attained before the processor subsystem 207 can boot up in this example. Alternatively, as another example, if the processor subsystem 207 requires a supply voltage of 3.25 V and at least 20 mAh to boot up its operating system and essential applications, and the battery 201 is an HV lithium-ion battery (e.g., LCO battery) with a cutover voltage of 3.3 V, the battery voltage threshold may be determined to be 3.3 V because the battery cutover voltage needs to be attained before the battery 201 can supply the required boot-up power to the processor subsystem 207 in this example. In one embodiment, the power requirements information for the processor subsystem 207 may be stored in memory 210 or other memory accessible by the microcontroller 230. In such a case, the microcontroller 230 may retrieve the processor subsystem's power requirements and determine the battery voltage threshold or other SOC parameter threshold based on the battery type and the processor subsystem's power requirements. Alternatively, memory 210 or other memory accessible by the microcontroller 230 may store the battery voltage threshold or other SOC parameter threshold directly, in which case the threshold would have been determined prior to storage so as to correspond to the power requirements of the processor subsystem 207 used in the particular portable electronic device 200.

After the microcontroller 230 has determined the battery type, determined an SOC parameter for the battery 201 (e.g., battery voltage), and compared the SOC parameter to an appropriate threshold corresponding to the minimum boot-up or other threshold level power requirements of the processor subsystem 207, the microcontroller 230 sends a control signal to the power path selection and control block 303 causing the power path selection and control block 303 to permit power to be supplied from the battery charger 240 to the battery 201 in the event that SOC parameter is less than the threshold. According to one embodiment, memory 210 stores a charging profile for charging a battery originally supplied with the portable electronic device 200. When the current battery 201 is different than the original battery, the microcontroller 230 may adapt the charging profile based on the determined battery type so that the current battery 201 is safely and properly charged. Additionally, the microcontroller 230 may also take the type of battery charger into consideration when adapting the charging profile for the battery 201. For example, the microcontroller 230 may use one charging profile for charging an LV lithium-ion battery from a USB charger and a different charging profile for charging an LCO battery from a wireless charger. Accordingly, the microcontroller 230 may adapt or adjust the charging profile based on battery type and/or charger type. Other battery parameters, such as battery temperature and end of life voltage, may also be used to adapt or adjust the charging profile for the current battery 201. For example, various charging profiles may be stored in memory 210 or other memory accessible by the microcontroller 230, thereby enabling the microcontroller 230 to select the appropriate profile based on the battery type, the charger type, and/or select battery parameters.

In the event that the battery's SOC parameter is greater than or equal to a threshold corresponding to the minimum boot-up or other threshold level power requirements of the processor subsystem 207, the microcontroller 230 sends a control signal to the USB switch 234 causing the switch 234 to direct the data outputs of the USB connector 307 to the USB physical interface 310 of the processor subsystem 207. Additionally, the microcontroller 230 instructs the power path selection and control block 303 to permit power to flow from the battery 201 to the regulators 304 for distribution to the processor subsystem 207 and the other system loads of the portable electronic device 200. The microcontroller 230 may also instruct the power path selection and control block 303 to disable the flow of power from the charger 240 to the battery 201, and may issue a reset release signal to the processor subsystem 207 (e.g., via the USB interface 309) to activate the processor subsystem 207 in accordance with known techniques where reset of the processor subsystem 207 is externally performed.

While the disclosure above with the respect to FIG. 3 focused on one particular embodiment for implementing the power management subsystem 203, a more general operation of the portable electronic device 200 to recover power to its rechargeable battery 201 when the battery is in a low state of charge (e.g., at or below its end of life voltage) may be readily understood with reference to FIGS. 2 and 4. FIG. 4 illustrates a logic flow diagram 400 of steps executed by a portable electronic device 200 to recover power to a rechargeable battery 201 based on battery type in accordance with another exemplary embodiment of the present invention. Most of the logic flow steps of FIG. 4 may be executed by the power management subsystem 203 once the power management subsystem 203 is powered up by the battery charger 240. Execution of logic flow steps by the power management subsystem 203 is preferably in accordance with operating instructions stored in memory 210 or other memory accessible by the power management system 203 and/or within internal memory of the power management system 203 or its associated microcontroller 230 (when used).

According to the logic flow of FIG. 4, the portable electronic device 200 determines (401) whether a battery charger 240 is directly or indirectly (e.g., wirelessly) attached to the power source receptor 205. Such a determination may be made by the power source receptor's detection of a DC voltage input or wireless signal from the battery charger 240. Alternatively, determination of attachment of a battery charger 240 may be made by the power management subsystem 203 via receipt of DC power at the power management subsystem 203. When a charger 240 is detected, the power source receptor 205 receives (403) power from the charger 240 and provides (405) the power to the power management subsystem 203 to power-up the power management subsystem 203.

Upon being powered-up, the power management subsystem 203 may optionally determine (407) the charger type when the charger type may affect the battery charging process. For example, the power management subsystem 203 may determine (409) whether the charger 240 is a USB charger based on whether a voltage (Vbus) is outputted by a USB connector 307 of the portable electronic device 200. If the charger 240 is a USB charger, the power management subsystem 203 may activate a USB physical interface to the power management subsystem 203 (e.g., the USB physical interface 309 of the subsystem's microcontroller 230) and request (411) the USB host device, such as an attached computer serving as the battery charger 240, to source maximum power (e.g., 500 mA at 5V nominal). The request for maximum power may be made by the power management subsystem 203 to the host device through the data pins (DP, DM) of the USB connector 307. If the charger 240 is a conventional wall charger or a wireless charger, which can typically supply between 100 mA and 1500 mA at a nominal voltage of 5V, a request for maximum power need not be made. Therefore, power may be supplied from the charger 240 to the battery 201 based at least partially on the battery charger type under the control of the power management subsystem 203. Additionally, the charging profile used to charge the battery 201 may be adapted or modified based on the charger type because different chargers may supply power differently. For instance, USB chargers may provide power at different rates and levels than conventional wall chargers.

Besides the optional determination of charger type, the power management subsystem 203 determines (413) a battery type for the battery 201 and further determines (415) a state-of-charge (SOC) parameter for the battery 201. To determine the battery type, the power management subsystem 203 may retrieve information from the battery 201 and determine the battery type based on the retrieved information. For example, the battery 201 may include a memory 222 containing an identification (ID) of the battery 201 from which the battery type can be determined. The ID may be a number, a description, or any other data from which the battery 201 may be identified. In this case, the power management subsystem 203 may retrieve the battery ID and compare it to a set of battery IDs stored in a memory 210 of the portable electronic device 200 accessible by the power management subsystem 203. For instance, the portable device memory 210 may include a list of battery IDs and associated battery types such that the power management subsystem 203 may compare the retrieved ID to the list of IDs in order to determine the battery type. Besides storing the battery ID, the battery memory 222 may also store an indication of the battery manufacturer, a location at which the battery 201 was manufactured, warranty information, and/or various other battery-related data.

In an alternative embodiment, the battery memory 222 may store SOC information for the battery 201 instead of or in addition to the battery ID. The SOC information may include an end of life voltage, a maximum output voltage, a charging rate, a discharge rate, and other charging-related information for the battery 201. The power management subsystem 203 may retrieve the SOC information, or a portion of it, from the battery memory 222 and determine the battery type based on the retrieved SOC information. For example, upon retrieving an end of life voltage from the battery memory 222, the power management subsystem 203 may compare the end of life voltage to a threshold to determine whether the battery is of a low voltage (LV) type or of a high voltage (HV) type. For lithium-ion batteries, the threshold may be three volts, such that batteries with end of life voltages less than three volts are considered LV type and batteries with end of life voltages greater than or equal to three volts are considered HV type.

To determine an SOC parameter for the battery 201, the power management subsystem 203 may measure, detect, and/or compute the selected parameter in accordance with known techniques. For example, as discussed above with respect to FIG. 3, the power management subsystem 203 may detect the voltage of the battery 201. Alternatively or additionally, the power management subsystem 203 may estimate the energy capacity (e.g., as a coulomb count or in amp-hours or watt-hours) remaining in the battery 201 either directly or as a percentage of the battery's rated energy capacity. One known method for estimating the battery's remaining energy capacity includes detecting the battery voltage and employing a known function to estimate the remaining energy capacity based on the voltage, the battery temperature (which may also be determined by the power management subsystem 203 as discussed below), the battery discharge rate (which may have been measured during operation of the portable electronic device 200 or determined from the SOC information stored in the battery memory 222), and the battery's age (which may be determined from the SOC information stored in the battery memory 222 where the stored SOC information includes a date of manufacture). Another known method for estimating the remaining energy capacity of the battery 201 includes counting the coulombs used to charge the battery 201 (e.g., by integrating the charge current over time), counting the coulombs discharged by the battery 201 (e.g., by integrating the discharge current over time), and determining the difference between the charging coulomb count and the discharging coulomb count. Those of ordinary skill in the art will readily recognize and appreciate that other known methods may be additionally or alternatively employed to determine one or more SOC parameters for the battery 201.

Having determined the battery type and at least one SOC parameter for the battery 201, the power management subsystem 203 proceeds to determine whether the battery 201 needs to be recovered or whether the battery 201 has adequate energy capacity to source power to the main processor subsystem (e.g., processor subsystem 207 where the portable electronic device 200 is a wireless communication device). For example, according to the embodiment illustrated in FIG. 4, the power management subsystem 203 determines (417) whether the battery 201 is of a first type (e.g., an LV type). If the battery 201 is of the first type, the power management subsystem 203 optionally determines (419) whether the battery temperature is within a predetermined range suitable for charging or operation of a battery 201 of the first type (e.g., 0 degrees Celsius to 45 degrees Celsius for an LV lithium-ion battery). Battery temperature may be determined prior to, contemporaneously with, or after determination of the battery type and/or the SOC parameter(s) for the battery 201. If the battery temperature has been determined and is within the appropriate range, the power management subsystem 203 determines (421) whether the SOC parameter for the battery 201 is greater than or equal to an SOC parameter threshold for the first type of battery 201 (in this case, an LV type battery). For example, if the SOC parameter is battery voltage, the threshold may be the end of life or cutover voltage for the battery 201 or a minimum voltage required by the main processor subsystem. In the event that the SOC parameter is less than the SOC parameter threshold, the power management subsystem 203 determines that the battery 201 is in a low state of charge (e.g., has insufficient energy capacity to supply the main processor subsystem) and supplies (423) power from the battery charger 240 to the battery 201 to facilitate recovery of the battery 201. On the other hand, in the event that the SOC parameter is greater than or equal to the SOC parameter threshold, the power management subsystem 203 determines that the battery 201 has sufficient energy capacity to supply the main processor subsystem and supplies (425) power from the battery 201 to the main processor subsystem. When recharging is necessary, the power management subsystem 203 may re-determine the SOC parameter for the battery 201 (and optionally the battery temperature) continuously or after the battery 201 has recharged for a predetermined time period (e.g., every five minutes) and compare the re-determined SOC parameter to the SOC parameter threshold to determine (421) whether the SOC parameter is greater than or equal to the SOC parameter threshold.

If the power management subsystem 203 determines (417) that the battery is of a second type (e.g., an LCO battery or other battery of an HV type for purposes of the example illustrated in FIG. 4), the power management subsystem 203 optionally determines (427) whether the battery temperature is within a predetermined range suitable for charging or operation of a battery 201 of the second type (e.g., 0 degrees Celsius to 45 degrees Celsius for an LCO battery). If the battery temperature has been determined and is within the appropriate range, the power management subsystem 203 determines (429) whether the SOC parameter for the battery 201 is greater than or equal to an SOC parameter threshold for the second type of battery 201 (in this case, an LCO type battery). For example, if the SOC parameter is battery voltage, the threshold may be the end of life or cutover voltage for the battery 201 or a minimum voltage required by the main processor subsystem. In the event that the SOC parameter is less than the SOC parameter threshold, the power management subsystem 203 determines that the battery 201 is in a low state of charge (e.g., has insufficient energy capacity to supply the main processor subsystem) and supplies (431) power from the battery charger 240 to the battery 201 to facilitate recovery of the battery 201. On the other hand, in the event that the SOC parameter is greater than or equal to the SOC parameter threshold, the power management subsystem 203 determines that the battery 201 has sufficient energy capacity to supply the main processor subsystem and supplies (425) power from the battery 201 to the main processor subsystem. When recharging is necessary, the power management subsystem 203 may re-determine the SOC parameter for the battery 201 (and optionally the battery temperature) continuously or after the battery 201 has recharged for a predetermined time period (e.g., every five minutes) and compare the re-determined SOC parameter to the SOC parameter threshold to determine (429) whether the SOC parameter is greater than or equal to the SOC parameter threshold.

Therefore, to summarize, a power management subsystem 203 of a portable electronic device 200 may control the supply of power from a battery charger 240 to a rechargeable battery 201 used in the portable electronic device 200 based on at least the battery's type and one or more SOC parameters for the battery 201. The provision of power from the charger 240 to the battery 201 may also be based on the battery's temperature and/or the charger type. If changes to an original or then-current charging profile for supplying voltage and current from the charger 240 to the battery 201 are necessary due to a change in battery type, charger type, and/or battery temperature, the charging profile may be adapted based on the battery type and optionally on the battery charger type and/or the battery temperature. The new charging profile may replace an existing charging profile stored in device memory 210 accessible by the power management subsystem 203. Those of ordinary skill in the art will readily recognize and appreciate that the order of steps 407-415 and 419 or 427 (i.e., the order in which the battery type, the battery temperature, and the battery SOC parameter(s) are determined) is not critical to the invention and may occur in an order different than the order illustrated in FIG. 4 while still achieving the benefits of the present invention.

The present invention encompasses a portable electronic device and associated method for recovering power to a rechargeable battery used in the portable electronic device when the battery is in a low state of charge. With this invention, the battery charging profile may be adapted to account for changes in battery type, thereby allowing existing portable electronic devices and those under development to use newer battery technologies without requiring operating system changes or other changes to the main processor subsystem. In other words, the present invention incorporates the forward compatibility of battery technology into portable electronic devices so that such devices can enjoy the efficiency and other benefits of new battery technologies with negligible, if any, adverse impact on the devices' main processor systems.

As detailed above, embodiments of the present invention reside primarily in combinations of method steps and/or apparatus components related to recovering power to a rechargeable battery used in the portable electronic device when the battery is in a low state of charge. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as "first" and "second," "top" and "bottom," and the like may be used solely to distinguish one entity or action from another entity or action without necessarily requiring or implying any actual such relationship or order between such entities or actions. The terms "comprises," "comprising," "includes," "including," "has," "having," "contains," "containing," and any other variations thereof are intended to cover a non-exclusive inclusion, such that a process, method, article, or apparatus that comprises, includes, has, or contains a list of elements does not include only those elements but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

It will be appreciated that embodiments of the portable electronic device 200 described herein may be comprised of one or more conventional processors and unique stored program instructions that control the processor(s) to implement, in conjunction with certain non-processor circuits, some, most, or all of the functions of the portable electronic device 200 and its operational methods as described herein. The non-processor circuits may include, but are not limited to, storage devices, such as memory 209, 210, the battery 201, and the power source receptor 205 described above, as well as filters, clock circuits, and various other non-processor circuits. As such, the functions of these non-processor circuits may be interpreted as steps of a method to recover power to a rechargeable battery used in the portable electronic device when the battery is in a low state of charge. Alternatively, some or all functions could be implemented by a state machine that has no stored program instructions, or in one or more application specific integrated circuits (ASICs), in which each function or some combinations of certain of the functions are implemented as custom logic. Of course, a combination of the various approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions or programs and integrated circuits without undue experimentation.

In the foregoing specification, specific embodiments of the present invention have been described. However, one of ordinary skill in the art will appreciate that various modifications and changes can be made without departing from the scope of the present invention as set forth in the claims below. For example, the power management subsystem 203 may be implemented using a microprocessor, a state machine, or control logic instead of a microcontroller 230. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A method for recovering power to a rechargeable battery in a portable electronic device when the battery is in a low state of charge, the battery being of a determinable battery type, the method comprising:
   providing power from a battery charger to a power management subsystem to power-up the power management subsystem;
   after power-up of the power management subsystem, retrieving, by the power management subsystem, stored state-of-charge information for the battery;
   determining, by the power management subsystem, a battery type for the battery based on the retrieved state-of-charge information;
   determining, by the power management subsystem, a then-current state-of-charge parameter for the battery;
   comparing, by the power management subsystem, the then-current state-of-charge parameter for the battery to a threshold, wherein the threshold is based on at least the battery type;
   in the event that the then-current state-of-charge parameter for the battery is less than the threshold, providing power from the battery charger to the battery for use in recharging the battery; and
   in the event that the then-current state-of-charge parameter for the battery is greater than or equal to the threshold, supplying power from the battery to a processor subsystem that controls general operation of the portable electronic device, the processor subsystem having greater power requirements than the power management subsystem.

2. The method of claim 1, further comprising:
   after the battery has been recharging for a predetermined time period, re-determining, by the power management subsystem, the then-current state-of-charge parameter for the battery.

3. The method of claim 1, wherein the threshold is based on at least the battery type and an amount of power required by the processor subsystem.

4. The method of claim 1, further comprising:
   determining, by the power management subsystem, a type for the battery charger;
   wherein providing power from the battery charger to the battery for use in recharging the battery includes:
      providing power from the battery charger to the battery based on at least the battery type and the battery charger type.

5. The method of claim 4, further comprising:
   determining, by the power management subsystem, a temperature of the battery,
   wherein providing power from the battery charger to the battery for use in recharging the battery includes:
      providing power from the battery charger to the battery based on at least the battery type, the battery charger type, and the battery temperature.

6. The method of claim 4, wherein providing power from the battery charger to the battery for use in recharging the battery further comprises:
   adapting a charging profile for voltage and current supplied from the battery charger to the battery based on at least one of the battery type and the battery charger type.

7. The method of claim 1, wherein providing power from the battery charger to the battery for use in recharging the battery comprises:
   adapting a charging profile for voltage and current supplied from the battery charger to the battery based on at least the battery type.

8. The method of claim 1, further comprising:
   determining, by the power management subsystem, a type for the battery charger; and
   when the battery charger is a Universal Serial Bus (USB) type charger, requesting, by the power management subsystem, maximum power from a USB host device that is sourcing power through the USB type charger.

9. A method for recovering power to a rechargeable battery in a portable electronic device when the battery is in a low state of charge, the battery being of a determinable battery type, the method comprising:
   receiving power from a battery charger coupled to the portable electronic device to produce received power;
   providing the received power to a power management subsystem to power-up the power management subsystem;
   after power-up of the power management subsystem, retrieving, by the power management subsystem, stored state-of-charge information for the battery;
   determining, by the power management subsystem, a battery type for the battery based on the retrieved state-of-charge information;
   determining, by the power management subsystem, a then-current state-of-charge parameter for the battery;
   comparing, by the power management subsystem, the then-current state-of-charge parameter for the battery to a threshold, wherein the threshold is based on at least the battery type and an amount of power required by a processor subsystem, the processor subsystem controlling general operation of the portable electronic device and having greater power requirements than the power management subsystem;

in the event that the then-current state-of-charge parameter for the battery is less than the threshold, providing power from the battery charger to the battery for use in recharging the battery; and in the event that the then-current state-of-charge parameter for the battery is greater than or equal to the threshold, supplying power from the battery to the processor subsystem.

10. The method of claim 9, further comprising:
determining, by the power management subsystem, a type for the battery charger; and
when the battery charger is a Universal Serial Bus (USB) type charger, requesting, by the power management subsystem, maximum power from a USB host device that is sourcing power through the USB type charger.

11. A portable electronic device comprising:
a rechargeable battery of a determinable battery type;
memory that stores state-of-charge information for the battery;
a power source receptor operable to receive power from an external battery charger;
a processor subsystem operably coupled to the battery and operable to control general operation of the portable electronic device upon receiving a threshold level of power; and
a power management subsystem operably coupled to the power source receptor and the battery, the power management subsystem being operable to:
power-up upon receipt of power from the battery charger via the power source receptor;
after power-up, retrieve stored state-of-charge information for the battery from the memory;
determine a battery type for the battery based on the retrieved state-of-charge information;
determine a then-current state-of-charge parameter for the battery;
compare the then-current state-of-charge parameter for the battery to a threshold corresponding to the threshold level of power required by the processor subsystem, wherein the threshold is based on at least the battery type;
enable power to be supplied from the battery charger to the battery for use in recharging the battery in the event that the then-current state-of-charge parameter for the battery is less than the threshold; and
enable power to be supplied from the battery to the processor subsystem in the event that the then-current state-of-charge parameter for the battery is greater than or equal to the threshold;
wherein the processor subsystem has greater power requirements than the power management subsystem.

12. The portable electronic device of claim 11, further comprising:
memory operably coupled to the power management subsystem and operable to store power requirements information for the processor subsystem,
wherein the power management subsystem is further operable to:
determine the threshold based on at least the battery type and the power requirements information.

13. The portable electronic device of claim 11, wherein the power management subsystem includes a microcontroller.

14. The portable electronic device of claim 13, wherein the power source receptor is a Universal Serial Bus (USB) connector, wherein the power management subsystem further includes a USB switch operable under control of the microcontroller, and wherein the microcontroller is operable to instruct the USB switch to route data from the USB connector to the processor subsystem.

15. The portable electronic device of claim 11, wherein the battery is of a type having an end of life voltage of at least three volts.

16. The portable electronic device of claim 11, wherein the battery is of a type having an end of life voltage of less than three volts.

17. The portable electronic device of claim 11, wherein the portable electronic device is a wireless communication device.

18. The portable electronic device of claim 11, wherein the then-current state-of-charge parameter for the battery includes at least one of voltage and remaining energy capacity.

19. The portable electronic device of claim 11, wherein the power management subsystem is further operable to:
adapt a charging profile for voltage and current supplied from the battery charger to the battery based on at least the battery type.

20. The portable electronic device of claim 11, wherein the power management subsystem is further operable to:
determine a type for the battery charger; and
adapt a charging profile for voltage and current supplied from the battery charger to the battery based on at least the battery type and the battery charger type.

21. The portable electronic device of claim 11, wherein the power management subsystem is further operable to:
determine a type for the battery charger; and
when the battery charger is a Universal Serial Bus (USB) type charger, request maximum power from a USB host device that is sourcing power through the USB type charger.

22. A portable electronic device comprising:
a rechargeable battery of a determinable battery type;
memory that stores state-of-charge information for the battery;
a connector operable to receive power from a Universal Serial Bus (USB) host device through a USB type battery charger;
a processor subsystem operably coupled to the battery and operable to control general operation of the portable electronic device upon receiving a threshold level of power; and
a power management subsystem operably coupled to the connector and the battery, the power management subsystem being operable to:
power-up upon receipt of power from the connector;
after power-up, retrieve stored state-of-charge information for the battery from the memory and request maximum power from the USB host device through the connector and the USB type charger;
determine a battery type for the battery based on the retrieved state-of-charge information;
determine a then-current state-of-charge parameter for the battery;
compare the then-current state-of-charge parameter for the battery to a threshold corresponding to the threshold level of power required by the processor subsystem, wherein the threshold is based on at least the battery type;

enable power to be supplied from the connector to the battery for use in recharging the battery in the event that the then-current state-of-charge parameter for the battery is less than the threshold; and enable power to be supplied from the battery to the processor subsystem in the event that the then-current state-of-charge parameter for the battery is greater than or equal to the threshold;

wherein the processor subsystem has greater power requirements than the power management subsystem.

* * * * *